Feb. 15, 1938.  A. W. COMRIE  2,108,042
NAVIGATIONAL INSTRUMENT
Filed June 24, 1936
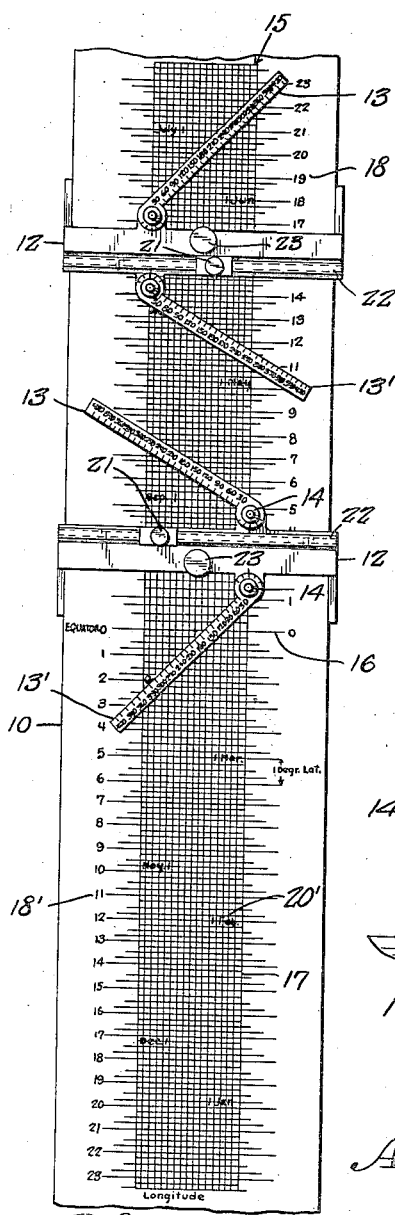
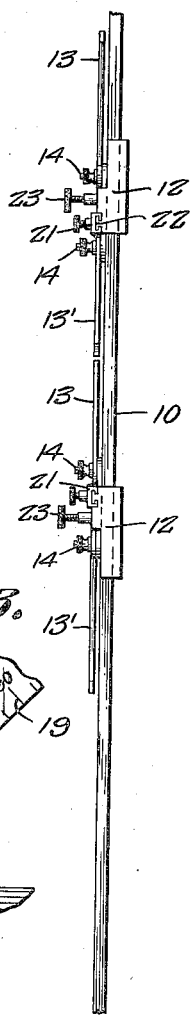
Andrew W. Comrie, INVENTOR
BY Victor J. Evans & Co.
ATTORNEYS
WITNESS P. J. Hickey.

Patented Feb. 15, 1938

2,108,042

UNITED STATES PATENT OFFICE 2,108,042

NAVIGATIONAL INSTRUMENT

Andrew W. Comrie, Miami, Fla.

Application June 24, 1936, Serial No. 87,087

3 Claims. (Cl. 33—80)

This invention relates to navigating instruments and has for the primary object the provision of a simple and inexpensive device of this character which is in the form of a chart including a scale setting forth meridians of longitude and selected parallels of latitude and arms pivotally and slidably mounted and provided with scales denoting miles and course-denoting positions, whereby a person having knowledge of the number of miles traveled from a point of departure may, by selecting the proper arm and moving it along its respective zero line until the pivot thereof registers with the parallel of latitude left and adjusting it for the course sailed, at any time, with sufficient accuracy for practical navigation, determine at sight his latitude arrived at and the difference in longitude.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a plan view illustrating a navigating instrument constructed in accordance with my invention.

Figure 2 is an edge elevation illustrating the same.

Figure 3 is a fragmentary plan view showing scales of one of the arms.

Referring in detail to the drawing, the numeral 10 indicates a panel and slidably secured thereto are carriages 12, each having arms 13 and 13' pivoted thereto, as indicated by the character 14. The carriages 12 traverse a face of the panel 10 and the arms may be adjusted to different angular positions over said face. Located on said face of the panel is a chart 15 denoting the equator by the marking 16 and scales setting forth meridians of longitude indicated by the character 17 and preselected parallels of latitude indicated by the characters 18 and 18'.

Each arm has a scale 19, denoting nautical miles and at the pivot thereof is a 90 degree course-denoting scale 20.

While the chart 15 is shown in the drawing as having a limited number of subdivisions of longitude it is to be understood that the scale of the chart may be extended to cover a greater amount of departures. It is also to be understood that the latitude scale may be increased or diminished in the making thereof.

The arm 13 of one of the carriages is used when traveling a course in a northeast sector and the arm 13' of the same carriage is used when traveling a course in a southeast sector. The arm 13 of the other carriage is used when traveling in a northwest sector and the arm 13' of the latter-named carriage is used when traveling in a southwest sector.

In use, the proper arm is selected, depending in which sector the course is being traveled and by having knowledge of the number of miles traveled from the point of departure over a selected course, the arm is set by placing the pivot thereof on the latitude of departure and is swung at the proper angle in accordance with the selected course by referring to the scale 20. Then by referring to scale 19 on the arm, that is the number thereon which corresponds to the number of miles traveled and the parallel of latitude which meets therewith, will denote visibly to a person the latitude arrived at; and the vertical line passing through said point or number will indicate the difference in longitude.

The chart is shown as covering approximately 23 degrees of north latitude and 23 degrees of south latitude. For the convenience of the navigator the chart is also provided with indicia to indicate the approximate declination of the sun on any day of the year, the indicia being indicated by the character 20'. As a further convenience for the navigator, pointers 21 are adapted to slide on mountings 22, forming part of the carriages to indicate any of the vertical lines on the chart.

The carriages may be secured in any of their adjusted positions on the panel by set bolts 23.

Having described the invention, I claim:

1. A navigating instrument comprising a panel, a chart located on said panel and including scale denoting meridians of longitude and selected parallels of latitude, a carriage slidably mounted on the panel and traversing a face of the latter on which the chart is located, an arm pivotally connected to each side edge of said carriage with the pivots in alinement with one another and each arm having a scale denoting miles and course-denoting positions whereby a person having knowledge of the number of miles traveled from a point of departure may, by selecting the proper arm and moving it along its respective zero line until the pivot thereof registers with the parallel of latitude left and adjusting the said last-named arm for the course sailed, determine at sight the latitude arrived at and the difference in longitude.

2. A navigating instrument comprising a panel, a chart located on said panel and including scales denoting selected parallels of latitude and meridians of longitude provided with a zero line at each end thereof, carriages slidably mounted on the panel and traversing a face of the latter on which the chart is located, and a pair of arms pivotally connected to one carriage with the pivot points in line with the zero line at one end of the meridian scale, a pair of arms pivotally connected to the other carriage with the pivot points in line with the zero line at the opposite end of the meridian scale, and each arm having a scale denoting miles and course-denoting positions whereby a person having knowledge of the number of miles traveled from a point of departure may, by selecting the proper arm and moving it along its respective zero line until the pivot thereof registers with the parallel of latitude left and adjusting the said last-named arm for the course sailed, determine at sight the latitude arrived at and the difference in longitude.

3. A navigating instrument comprising a panel, a chart located on said panel and including scales denoting selected parallels of latitude and meridians of longitude provided with a zero line at each end thereof, carriages slidably mounted on the panel and traversing a face of the latter on which the chart is located, a pair of arms pivotally connected to one carriage, with the pivot points in line with the zero line at one end of the meridian scale, a pair of arms pivotally connected to the other carriage with the pivot points in line with the zero line at the opposite end of the meridian scale and each arm having a scale denoting miles and course-denoting positions whereby a person having knowledge of the number of miles traveled from a point of departure may, by selecting the proper arm and moving it along its respective zero line until the pivot thereof registers with the parallel of latitude left and adjusting the said last-named arm for the course sailed, determine at sight the latitude arrived at and the difference in longitude, and pointers slidably secured to the carriages to indicate any of the vertical lines on the chart.

ANDREW W. COMRIE.